(12) United States Patent
Ding et al.

(10) Patent No.: US 7,296,465 B2
(45) Date of Patent: Nov. 20, 2007

(54) VERTICAL MOUNT MASS FLOW SENSOR

(75) Inventors: Junhua Ding, Tewksbury, MA (US);
Michael L'Bassi, Sterling, MA (US);
Kaveh H. Zarkar, Andover, MA (US)

(73) Assignee: MKS Instruments, Inc., Wilmington, MA (US)

( * ) Notice: Subject to any disclaimer, the term of this patent is extended or adjusted under 35 U.S.C. 154(b) by 39 days.

(21) Appl. No.: 11/284,452

(22) Filed: Nov. 22, 2005

(65) Prior Publication Data
US 2007/0113641 A1    May 24, 2007

(51) Int. Cl.
*G01F 1/68* (2006.01)
(52) U.S. Cl. ...................................... 73/202.5
(58) Field of Classification Search ............. 73/204.25, 73/202.5, 202.21, 204.17, 204.19, 204.23; 702/45
See application file for complete search history.

(56) References Cited

U.S. PATENT DOCUMENTS

| | | | |
|---|---|---|---|
| 4,100,801 A | 7/1978 | LeMay | |
| 5,279,154 A | 1/1994 | Vavra et al. | |
| 5,763,774 A | 6/1998 | Ha et al. | |
| 5,824,894 A * | 10/1998 | Lucas et al. | 73/202.5 |
| 6,044,701 A | 4/2000 | Doyle et al. | |
| 6,062,077 A * | 5/2000 | Azima | 73/204.27 |
| 6,240,776 B1 * | 6/2001 | McMillan et al. | 73/204.23 |
| 6,595,049 B1 | 7/2003 | Maginnis, Jr. et al. | |
| 6,668,641 B2 * | 12/2003 | Ambrosina et al. | 73/202.5 |
| 7,120,542 B2 * | 10/2006 | Kottenstette et al. | 702/45 |

FOREIGN PATENT DOCUMENTS

WO      WO 91/19959      12/1991

* cited by examiner

*Primary Examiner*—Jewel Thompson
(74) *Attorney, Agent, or Firm*—McDermott Will & Emery, LLP

(57) ABSTRACT

A thermal mass flow meter for measuring flow rate of a fluid includes a conduit that is configured to receive the fluid and that defines a primary flow path between an inlet and an outlet of the conduit. The conduit is bound at least in part by a sensor receiving surface. A thermal sensor tube has a thermal sensing portion that is mounted relative to the sensor receiving surface in a direction substantially perpendicular to both the primary flow path and the sensor receiving surface. When the thermal mass flow meter is mounted in a vertical direction so that fluid within the conduit flows in the vertical direction along the primary flow path, fluid within the sensor tube flows in a horizontal direction so as to substantially prevent thermal siphoning when the sensor tube is heated.

19 Claims, 4 Drawing Sheets

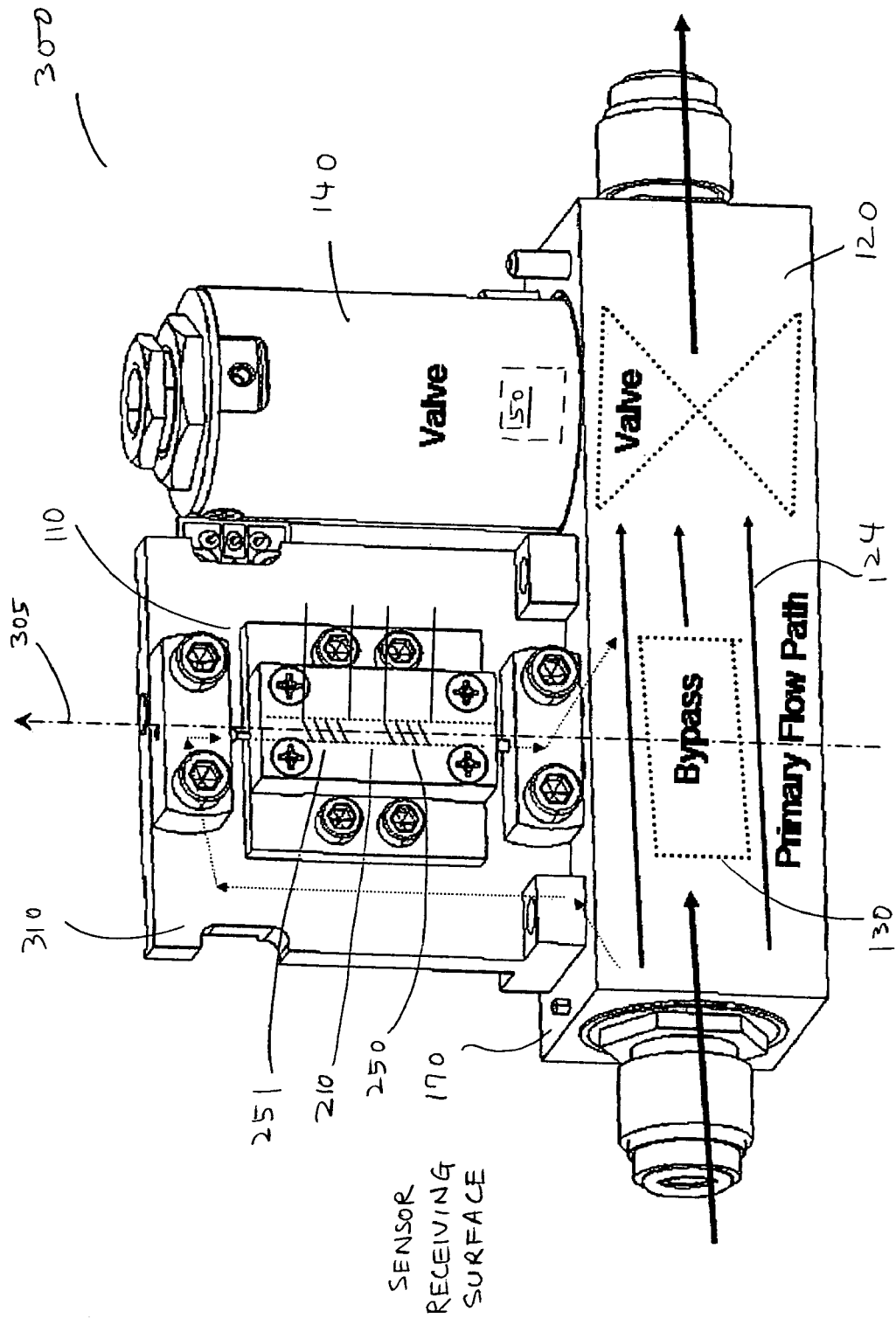

VERTICAL MOUNT MASS FLOW SENSOR

BACKGROUND OF THE INVENTION

Thermal siphoning in a mass flow controller (MFC) may refer to a continuous circulation of gas caused by the free convection between the heated thermal flow sensor and the bypass. Thermal siphoning may result in a non-zero output signal for the flow rate that resembles zero point drift, even when the actual output flow rate is zero. In some MFC designs, thermal siphoning effects may be more likely to occur if the mass flow controller is installed vertically, and may vary in proportion with the molecular weight and pressure of the fluid whose flow rate is being controlled.

In addition to causing the zero point calibration in mass flow controllers to shift, thermal siphoning may also cause a calibration shift in the span or dynamic range of the mass flow meter of the mass flow controller.

A method and system are needed that can prevent or reduce thermal siphoning effects when a thermal mass flow controller is vertically mounted, and that can provide a zero shift thermal mass flow sensor for a vertical flow thermal mass flow meter.

SUMMARY OF THE INVENTION

A thermal mass flow meter for measuring flow rate of a fluid includes a conduit that is configured to receive the fluid and that defines a primary flow path between an inlet and an outlet of the conduit. The conduit is bound at least in part by a sensor receiving surface. A thermal sensing portion of a thermal sensor tube is mounted relative to the sensor receiving surface in a direction substantially perpendicular to both the primary flow path and the sensor receiving surface. When the thermal mass flow meter is mounted in a vertical direction so that fluid within the conduit flows in the vertical direction along the primary flow path, fluid within the sensor tube flows in a horizontal direction so as to substantially prevent thermal siphoning when the sensor tube is heated.

A thermal mass flow controller for controlling flow rate of a fluid may include a conduit that is configured to receive the fluid and that defines a primary flow path between an inlet and an outlet of the conduit. The conduit may be bounded at least in part by a sensor receiving surface. The thermal mass flow controller may further include a thermal sensor tube having a thermal sensing portion mounted relative to the sensor receiving surface in a direction substantially perpendicular to both the primary flow path and the sensor receiving surface. The thermal mass flow controller may further include a temperature measuring system configured to measure a temperature differential between at least two locations along the thermal sensing portion of the sensor tube, when the sensor tube has been heated and fluid flows within the heated sensor tube. The thermal mass flow controller may further include a control valve configured to regulate flow of the fluid into the inlet and out of the outlet of the conduit, so that the fluid flows from the outlet at a desired flow rate.

When the thermal mass flow meter is mounted in a substantially vertical direction so that fluid within the conduit flows in the vertical direction along the primary flow path, fluid within the thermal sensing portion of the sensor tube may flow in a horizontal direction so as to substantially prevent thermal siphoning when the sensor tube is heated.

A method is described for preventing thermal siphoning in a mass flow controller for controlling flow rate of a fluid. The mass flow controller includes a thermal sensor tube has a thermal sensing portion, and further includes a conduit configured to receive the fluid. The conduit defines a primary flow path between an inlet and an outlet of the conduit, and is bounded at least in part by a sensor receiving surface. The method includes mounting the thermal sensing portion of the sensor tube in a direction substantially perpendicular to both the primary flow path and the sensor receiving surface. When the mass flow controller is mounted in a vertical direction so as to cause fluid within the conduit to flow along the primary flow path in the vertical direction, fluid within the thermal sensing portion of the sensor tube may flow along a horizontal direction so as to substantially prevent thermal siphoning when the sensor tube is heated.

BRIEF DESCRIPTION OF THE DRAWINGS

FIG. 2 illustrates a thermal MFC in which the thermal sensor tube is mounted in a direction perpendicular to the primary flow path and to a sensor receiving surface of the main flow body of the thermal mass flow meter in the MFC.

DETAILED DESCRIPTION OF THE INVENTION

A system and method are described for substantially preventing thermal siphoning in a thermal mass flow controller when the mass flow controller is vertically mounted.

Figure 1A:
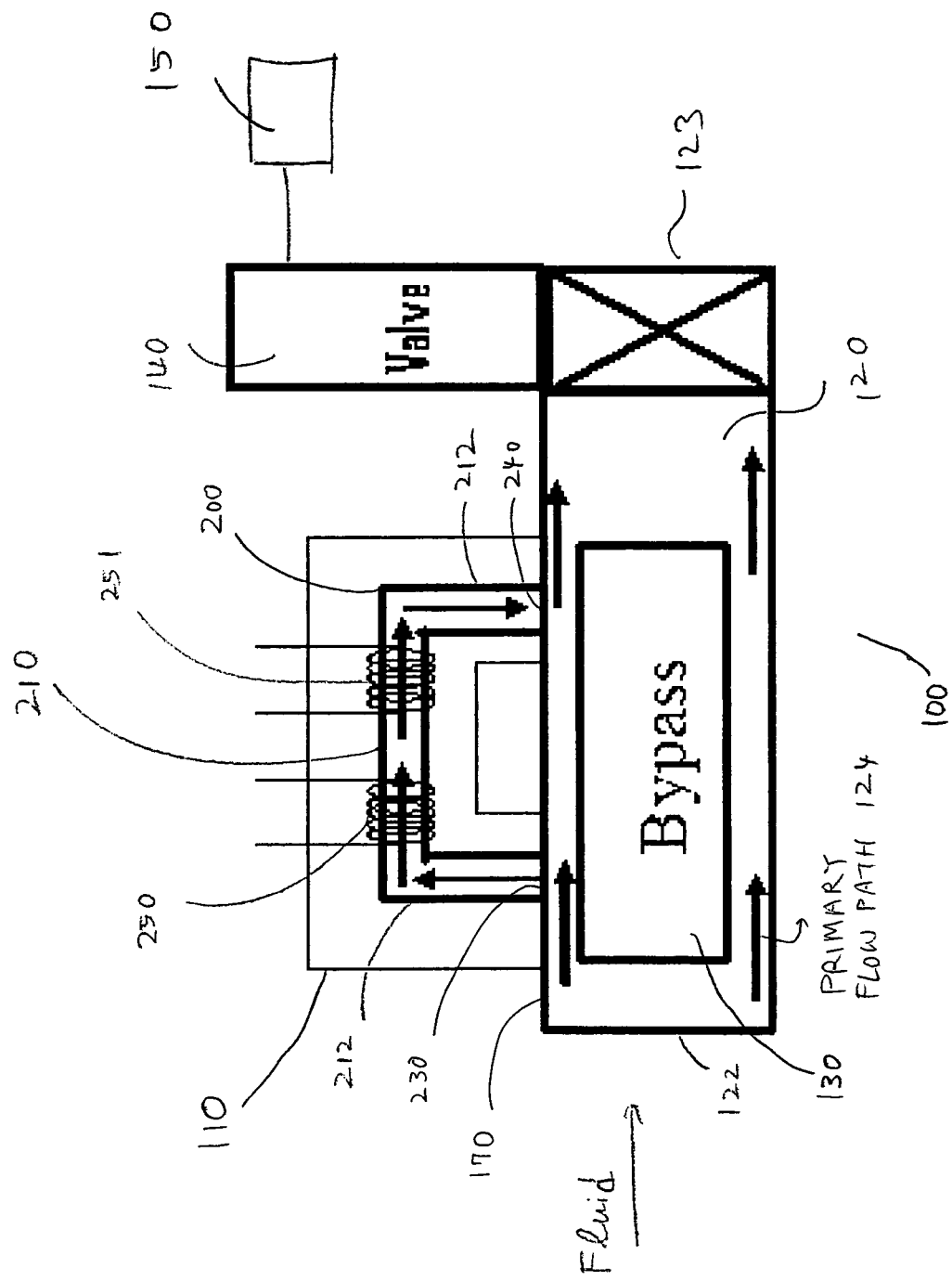
FIGS. 1A and 1B schematically illustrates the operation of a thermal mass flow controller, and the phenomenon of thermal siphoning.
Figure 1B:
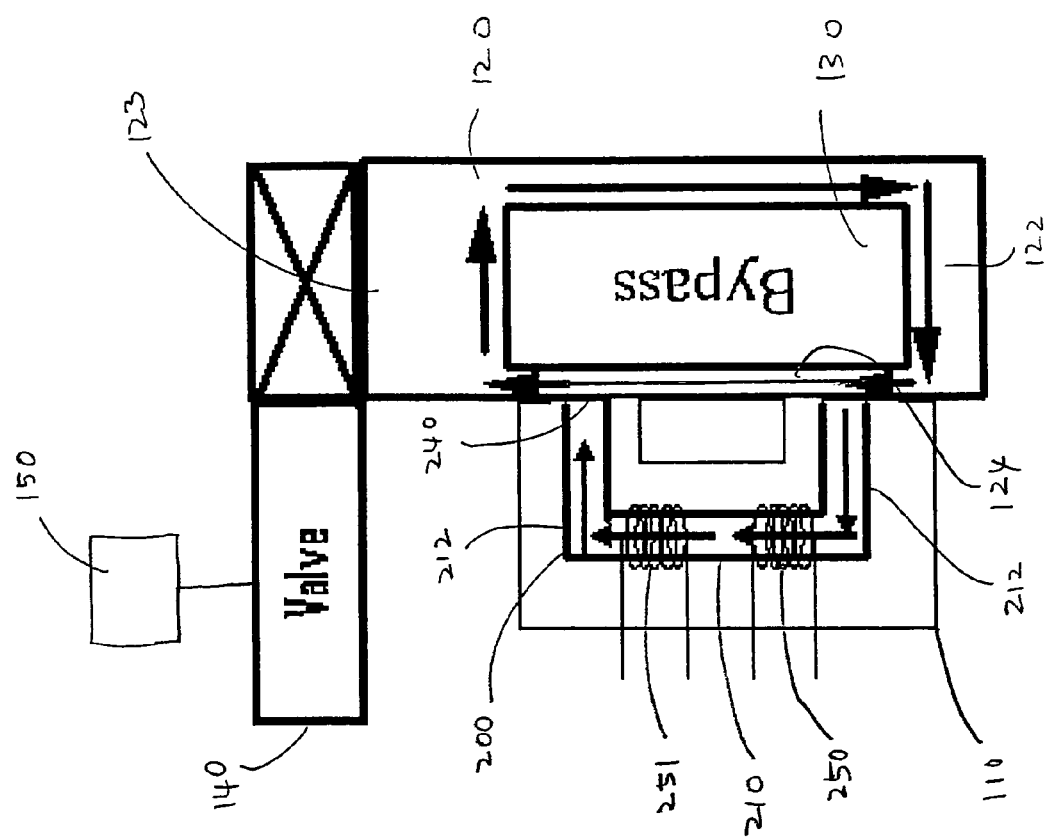

FIGS. 1A and 1B schematically illustrate the operation of a typical thermal MFC that measures and controls the mass flow rate of fluids, and also illustrate thermal siphoning that may occur when the MFC is mounted vertically, as shown in FIG. 1B. FIG. 1A illustrates a horizontally mounted thermal MFC, while FIG. 1B illustrates a thermal MFC that is the same as the MFC shown in FIG. 1A, but that is mounted vertically. In overview, thermal MFCs may measure the mass flow rate of a fluid by using the thermal properties of fluids and monitoring the temperature change of the heated sensor tube as the fluid flows therethrough. A thermal MFC may typically include a thermal mass flow meter which actually measures the mass flow rate of fluids, and a control assembly (including a valve and electronic control circuitry that controls the actuation of the valve), which regulates the flow rate of fluids so that the measured flow equals a desired flow setpoint. Typically, thermal MFCs may measure the mass flow rate of gases and vapors, although flow rates of fluids other than gases and vapors may also be measured.

Referring to FIG. 1A, the thermal MFC 100 may include: a thermal mass flow sensor assembly 110; a conduit 120 or flow body configured to receive at an inlet 122 the fluid whose flow rate is being measured/controlled; and a bypass 130 within the conduit 120. The thermal MFC 100 may further include a valve 140, and a controller 150 that controls the operation of the valve 140 in a way that provides a controlled flow of the fluid from an outlet 123 of the conduit 120.

The conduit 120 or flow body may define a primary flow path or channel 124, and is bounded at least in part by a sensor receiving wall or sensor receiving surface 170. In the illustrated embodiment, the sensor receiving surface 170 is shown as being substantially parallel to the primary flow path 124. The majority of the fluid that is introduced to the MFC through the inlet 122 of the conduit 120 may proceed through the primary flow path 124. A relatively small amount of the fluid may be diverted through the thermal mass flow sensor assembly 110 by the bypass 130, and may re-enter the primary flow path 124 downstream of the bypass 130. The bypass 130 may be a pressure dropping bypass that provides a pressure drop across the primary flow channel 124 so as to drive a relatively small portion of the incoming fluid through the thermal mass flow assembly. The inlets and outlets of the sensor tube 200 may coincide with the inlets and outlet of the primary flow channel 124, and therefore the pressure drop across the bypass 130 may be the same as the pressure drop across the sensor tube 200.

The thermal mass flow sensor assembly 110 may be attached to the sensor receiving surface 170 that forms at least a portion of a boundary of the conduit 120. The thermal mass flow sensor assembly 110 may include: a thermal sensor tube 200 configured to allow the diverted portion of the incoming fluid to flow within the tube between an inlet 230 and an outlet 240 of the tube 200; a sensor tube heater configured to heat the sensor tube; and a temperature measurement system configured to measure a temperature differential between two or more locations along the tube. The sensor tube 200 may be a thin-walled, small-diameter capillary tube, and may be made of stainless steel, although different sizes, configurations, and materials may also be used for the sensor tube 200.

The sensor tube 200 may include a thermal sensing portion 210, which in FIG. 1A is shown as being disposed horizontally, parallel to the primary flow path, and two legs 212 which are shown in FIG. 1A as being vertical. A pair of resistive elements 250 and 251 may be disposed in thermal contact with the thermal sensing portion 210 of the tube 200 at different locations along the thermal sensing portion 210, and may function as both the sensor tube heater and as part of the temperature measurement system. As shown in FIG. 1A, the resistive elements 250 and 251 may be resistive coils that are wound around the tube 200 at two locations along the thermal sensing portion 210 of the tube, one upstream (250) and the other downstream (251). The sensor tube 200 may be heated by applying an electric current to the resistive elements, which may thus function as a heater for the tube.

As fluid introduced into the inlet of the sensor tube flows through the heated sensor tube, at a substantially constant rate, more heat may be transferred to the downstream resistive element 251, as compared to the upstream element 250. The upstream coil 250 may be cooled by fluid flow, giving up some of its heat to the fluid that flows by, and the downstream coil 251 may be heated, taking some of this heat that was given to the flowing fluid. As a result, a temperature differential $\Delta T$ may thus be created between the two elements, and may provide a measure of the number of fluid molecules (i.e. the mass of the fluid) flowing through the sensor tube. The change in the resistance of each of the resistive elements, caused by the temperature difference, may be measured in order to determine the temperature differential, resulting in an output signal from the mass flow meter as a function of the mass flow rate of the fluid.

When the thermal sensor tube is mounted at certain orientations, and in particular the more the thermal sensing portion 210 sensor tube is oriented in a direction other than the horizontal direction, thermal siphoning may occur, caused by thermal gradients that appear inside the sensor tube as the sensor tube is heated. As explained below, thermal siphoning may occur in the vertically mounted MFC even when the control valve is completely closed as shown in FIG. 1B.

As the heat is transferred from the heated sensor tube surface to the gas, the temperature of the gas inside the heated sensor tube may increase, and the density of the gas may decrease. The cool, denser gas in the bypass area may be forced by gravity to fall. This in turn may force the hot, light gas in the heated sensor tube to rise. This phenomenon may be referred to as free convection. If the bypass area is cool enough, the hot gas rising from the heated sensor tube will cool and fall again. Thus a continuous circulation of gas inside the MFC, commonly referred to as thermal siphoning, will occur, even if the control valve is completely closed so that the output flow should be zero.

Thermal siphoning may cause shifts in zero, i.e. shift the null output to a non-zero signal. Thermal siphoning may also cause shifts in the span or dynamic range, i.e. in the flow rates covered by the relevant measuring range of the mass flow meter up to the maximum intended flow rate. As a result, the actual flow measurement may become a function of the inlet pressure and of the nature of the fluid. The thermal siphoning effects on zero and span (dynamic range) may increase with increasing inlet pressure and gas density.

The major factors that affect thermal siphoning may include gas density, the sensor tube diameter, and the attitude of the heated sensor tube. Gas density is an intrinsic property of the gas, and thus cannot be manipulated in order to reduce the thermal siphoning effect. Although the small internal diameter of the sensor tube in the MFC may generally reduce the effects of thermal siphoning, manufacturing a tube having such a small diameter may be difficult and impractical, and may limit the dynamic range of the MFC design. Therefore, the attitude of the heated sensor tube may be a good choice of a criterion to be adjusted in order to reduce thermal siphoning inside the MFC.

When the MFC is mounted horizontally, as shown in FIG. 1A, thermal siphoning may not be seen, because the free convective forces may sum to zero. The horizontal section 210 of the sensor tube may generate no convective force, and the convective forces generated by the two vertical legs 212 may cancel, so that the sum of the buoyancy forces may add up to zero.

When the MFC is rotated ninety degrees and mounted vertically, as shown in FIG. 1B, the sensor legs 212 may no longer generate any convective forces. However, the thermal sensing portion 210 containing the heater coils may now generate convective forces, because the thermal sensing portion 210 is now oriented vertically, not horizontally. Since the bypass is unheated, there may be no convective opposition, so that thermal siphoning may occur.

FIG. 2 illustrates one embodiment of a thermal mass flow controller 300 that is designed to substantially eliminate thermal siphoning when mounted vertically. The same reference numerals as in FIGS. 1A and 1B are used for all the sub-parts of the MFC 300, which is identical to the MFC 100 shown in FIGS. 1A and 1B, except for the direction in which the thermal sensor tube is mounted or oriented with respect to the primary flow path and with respect to the flow body that contains the bypass. As explained further below, in FIG. 2 the thermal sensor tube is mounted or oriented in a direction that is substantially vertical or perpendicular to the primary flow path and to the sensor receiving surface.

In the illustrated embodiment of the MFC 300, the thermal sensor tube is mounted relative to the conduit (which defines the primary flow path) in a direction 305 so that the thermal sensing portion 210 is substantially perpendicular to both the primary flow path 124 and the sensor receiving surface 170 (the latter being substantially parallel to the primary flow path 124 in the illustrated embodiment). As explained in conjunction with FIG. 3 below, this mounting configuration of the thermal sensor tube minimizes or substantially eliminates the thermal siphoning cause by free convection of the fluid inside the heated sensor tube, when the MFC is mounted vertically.

In the embodiment illustrated in FIG. 2, a supporting element 310 is provided that supports the sensor tube in the direction 305 substantially perpendicular to the primary flow path 124 and the sensor receiving surface 170. The supporting element 310 may be a supporting bracket, for example, and may be configured to secure the sensor tube assembly onto the conduit. The supporting element 310 may have apertures to let the fluid pass through the sensor tube and re-enter the primary flow path 124 downstream of the bypass 130.

Figure 3:
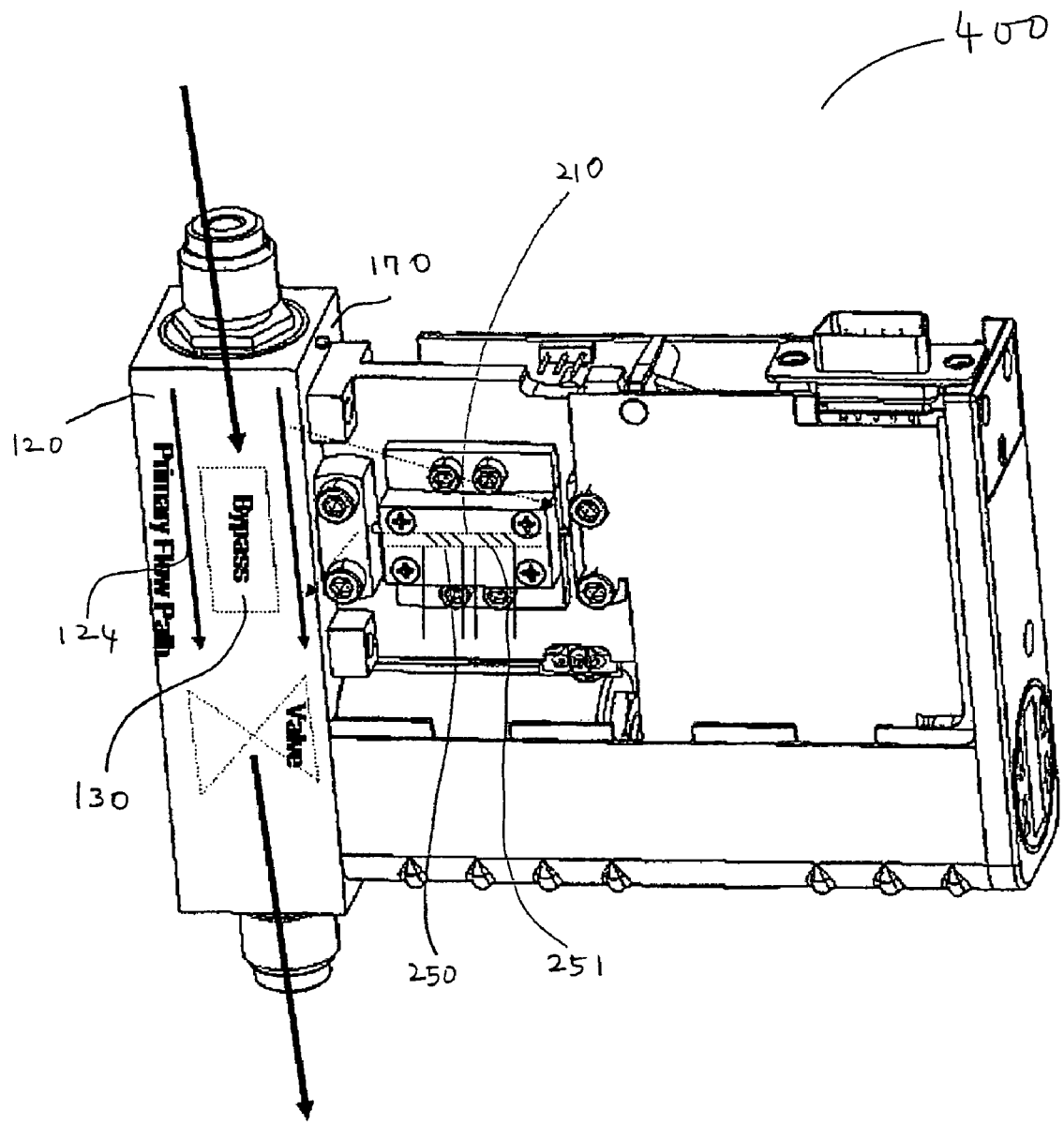
FIG. 3 illustrates the thermal MFC of FIG. 2 that has been mounted vertically so that fluid flows vertically within the flow body, and horizontally through the sensor tube.

FIG. 3 illustrates a thermal mass flow controller 400 that is the same as the one shown in FIG. 2 but is mounted vertically, i.e. illustrates a vertical flow thermal MFC. In the illustrated vertical flow thermal MFC, the incoming fluid (whose flow rate is being measured) flows vertically within the flow body or conduit, from an upper portion of the conduit to a lower portion of the conduit.

As seen in FIG. 3, when the thermal MFC is mounted in a vertical direction so that fluid within the conduit flows in the vertical direction along the primary flow path, fluid flow within the thermal sensing portion 210 of the sensor tube may remain horizontal. The thermal sensing portion 210 of the sensor tube (i.e. the section with the heater coils) is now oriented horizontally, and thus generates no convective force, while the convective forces generated by the two legs of the sensor tube cancel. In this way, thermal siphoning caused by convection may be minimized or substantially eliminated.

The thermal MFC shown in FIG. 3 may have a smaller footprint, compared to MFCs in which the sensor tubes are mounted transverse to the primary flow path and parallel to the sensor receiving surface of the flow body or conduit. For this reason, the conduit 120 of the embodiments shown in FIGS. 1A, 1B, 2, and 3 are all interchangeable, providing a distinct manufacturing advantage. In one embodiment, the thermal MFC may have a width of less than or equal to about 1.2 inches.

The thermal MFC shown in FIG. 3 may be used to minimize or reduce thermal siphoning effects in large bore flow sensors, which may be required in order to provide the low pressure drop that is necessary to deliver sub-atmospheric gases. For example, gas delivery at less than about 10 Torr bottle pressure, and accurate delivery of the same flow rates at full bottle of greater than about 1000 Torr, may typically require wide bore sensors. Although wide bore sensors generally work well, they may be sensitive to mounting attitude, due to the thermal siphoning effect. The vertical mounting of the sensor tube, in a direction perpendicular to both the primary flow path and the sensor receiving surface, may minimize the thermal siphoning problem without requiring an increase in footprint when such thermal MFCs are mounted vertically.

In sum, a system and method have been described that significantly reduces the thermal siphoning effect when a thermal MFC is mounted vertically, without requiring an increase in footprint.

While certain embodiments have been described of an apparatus and method that substantially eliminates thermal siphoning in a vertically mounted MFC, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A thermal mass flow meter for measuring flow rate of a fluid, the thermal mass flow meter comprising:
   a conduit configured to receive the fluid and defining a primary flow path between an inlet and an outlet of the conduit, the conduit bounded at least in part by a sensor receiving surface; and
   a thermal sensor tube having a thermal sensing portion mounted relative to the sensor receiving surface in a direction that is substantially perpendicular to both the primary flow path and the sensor receiving surface;
   wherein when the thermal mass flow meter is mounted in a vertical direction so that fluid within the conduit flows in the vertical direction along the primary flow path, fluid within the thermal sensing portion of the sensor tube flows in a horizontal direction so as to substantially prevent thermal siphoning when the sensor tube is heated.

2. The thermal mass flow meter of claim 1, further comprising a bypass within the conduit, the bypass configured to restrict a flow of fluid entering the inlet of the conduit so as divert a portion of the fluid onto an input end of the sensor tube.

3. The thermal mass flow meter of claim 2, wherein the bypass comprises a pressure dropping bypass configured to generate a pressure differential across the sensor tube.

4. The thermal mass flow meter of claim 1, wherein pressure at the inlet of the conduit is between about 4 Torr to about 1200 Torr.

5. The thermal mass flow meter of claim 2, further comprising a supporting element configured to support the sensor tube in the direction substantially perpendicular to the sensor receiving surface, and to secure the sensor tube onto the conduit.

6. The thermal mass flow meter of claim 5,
   wherein the supporting element includes one or more apertures, the apertures configured to allow the fluid to pass through the sensor tube and to re-enter the primary flow path at a location that is downstream relative to the bypass.

7. The thermal mass flow meter of claim 1, further comprising a temperature measurement system configured to measure a temperature differential between at least two locations along the thermal sensing portion of the sensor tube, when the sensor tube is heated and fluid flows within the heated sensor tube.

8. The thermal mass flow meter of claim 7, wherein the temperature measurement system comprises:
   a pair of thermally sensitive resistive elements, each of the elements having a resistance that varies as a function of temperature of the element; and a device configured to determine the temperature of each of the elements by measuring the resistance of each element.

9. The thermal mass flow meter of claim 1, further comprising a heater configured to heat at least a portion of the sensor tube.

10. The thermal mass flow meter of claim 9, wherein the heater comprises a pair of heating coils configured to resistively heat the thermal sensing portion of the sensor tube when an electric current is supplied thereto.

11. A thermal mass flow controller for controlling flow rate of a fluid, the thermal mass flow controller comprising:
- a conduit configured to receive the fluid and defining a primary flow path between an inlet and an outlet of the conduit, the conduit bounded at least in part by a sensor receiving surface;
- a thermal sensor tube having a thermal sensing portion mounted relative to the sensor receiving surface in a direction substantially perpendicular to both the primary flow path and the sensor receiving surface;
- a temperature measuring system configured to measure a temperature differential between at least two locations along the thermal sensing portion of the sensor tube, when the sensor tube has been heated and fluid flows within the heated sensor tube; and
- a control valve configured to regulate flow of the fluid into the inlet and out of the outlet of the conduit, so that the fluid flows from the outlet at a desired flow rate;
- wherein when the thermal mass flow meter is mounted in a substantially vertical direction so that fluid within the conduit flows in the vertical direction along the primary flow path, fluid within the thermal sensing portion of the sensor tube flows in a horizontal direction so as to substantially prevent thermal siphoning when the sensor tube is heated.

12. The mass flow controller of claim 11, further comprising a bypass within the conduit, the bypass configured to restrict a flow of a fluid entering the inlet of the conduit so as divert a portion of the fluid onto an input end of the sensor tube.

13. The mass flow controller of claim 12, wherein the bypass comprises a pressure dropping bypass configured to generate a pressure differential across the sensor tube.

14. The mass flow controller of claim 13, wherein pressure at the inlet of the conduit is between about 4 Torr to about 1200 Torr.

15. The mass flow controller of claim 11, wherein a width of the mass flow controller is less than about 1.2 inches.

16. The mass flow controller of claim 12, further comprising a supporting element configured to support the sensor tube in the direction substantially perpendicular to the sensor receiving surface and to the primary flow path.

17. The mass flow controller of claim 16, wherein the supporting element includes one or more apertures, the apertures configured to allow the fluid to pass through the sensor tube and to re-enter the primary flow path at a location that is downstream relative to the bypass.

18. A method of preventing thermal siphoning in a mass flow controller for controlling flow rate of a fluid, the mass flow controller including a thermal sensor tube having a thermal sensing portion, the mass flow controller further including a conduit configured to receive the fluid, the conduit defining a primary flow path between an inlet and an outlet of the conduit and bounded at least in part by a sensor receiving surface, the method comprising:
- mounting the thermal sensing portion of the thermal sensor tube relative to the sensor receiving surface in a direction that is substantially perpendicular to both the primary flow path and the sensor receiving surface;
- wherein when the mass flow controller is mounted in a vertical direction so as to cause fluid within the conduit to flow along the primary flow path in the vertical direction, fluid within the thermal sensing portion of the sensor tube flows along a horizontal direction so as to substantially prevent thermal siphoning when the sensor tube is heated.

19. The method of claim 18, further comprising supporting the sensor tube in the substantially perpendicular direction with a supporting element.

* * * * *